United States Patent [19]  
Wallis

[11] Patent Number: 4,462,290  
[45] Date of Patent: Jul. 31, 1984

[54] TUBE CUT-OFF MACHINE  
[76] Inventor: Bernard J. Wallis, 25315 Kean Ave., Dearborn, Mich. 48124  
[21] Appl. No.: 437,135  
[22] Filed: Oct. 27, 1982  
[51] Int. Cl.³ .............................................. B26D 1/56  
[52] U.S. Cl. ....................................... 83/311; 83/320; 74/602  
[58] Field of Search ................. 83/318, 319, 320, 298, 83/311, 37, 352, 373, 613; 74/55, 602

[56] References Cited  
U.S. PATENT DOCUMENTS

| | | | |
|---|---|---|---|
| 1,260,724 | 3/1918 | Slaughter | 74/55 |
| 2,325,431 | 7/1943 | Shippy | 83/320 |
| 2,540,166 | 2/1951 | Frank | 83/320 |
| 3,082,656 | 3/1963 | Day | 83/320 |
| 3,220,320 | 11/1965 | Brigham | 83/320 |
| 3,292,473 | 12/1966 | Couzens | 83/318 |
| 3,566,728 | 3/1971 | Ohmasu | 83/319 |
| 3,921,428 | 11/1975 | Freres | 83/298 |

FOREIGN PATENT DOCUMENTS

| | | | |
|---|---|---|---|
| 541326 | 5/1922 | France | 74/602 |
| 237040 | 7/1925 | United Kingdom | 83/320 |

Primary Examiner—James M. Meister  
Assistant Examiner—J. L. Knoble  
Attorney, Agent, or Firm—Barnes, Kisselle, Raisch, Choate, Whittemore & Hulbert

[57] ABSTRACT

A tube cut-off unit is arranged at the downstream end of a tube mill and is powered by a drive unit mechanically driven by the main shaft of the mill which drives the tube forming rolls. The drive unit mechanically rotates a crank which, through a link, reciprocates a slide along the path of travel of the tube. A tube cut-off blade on the slide is cam actuated to sever the tube. Means are provided to insure that the slide is moving at a constant speed and at the same speed as the tube when the tube is being severed.

3 Claims, 10 Drawing Figures

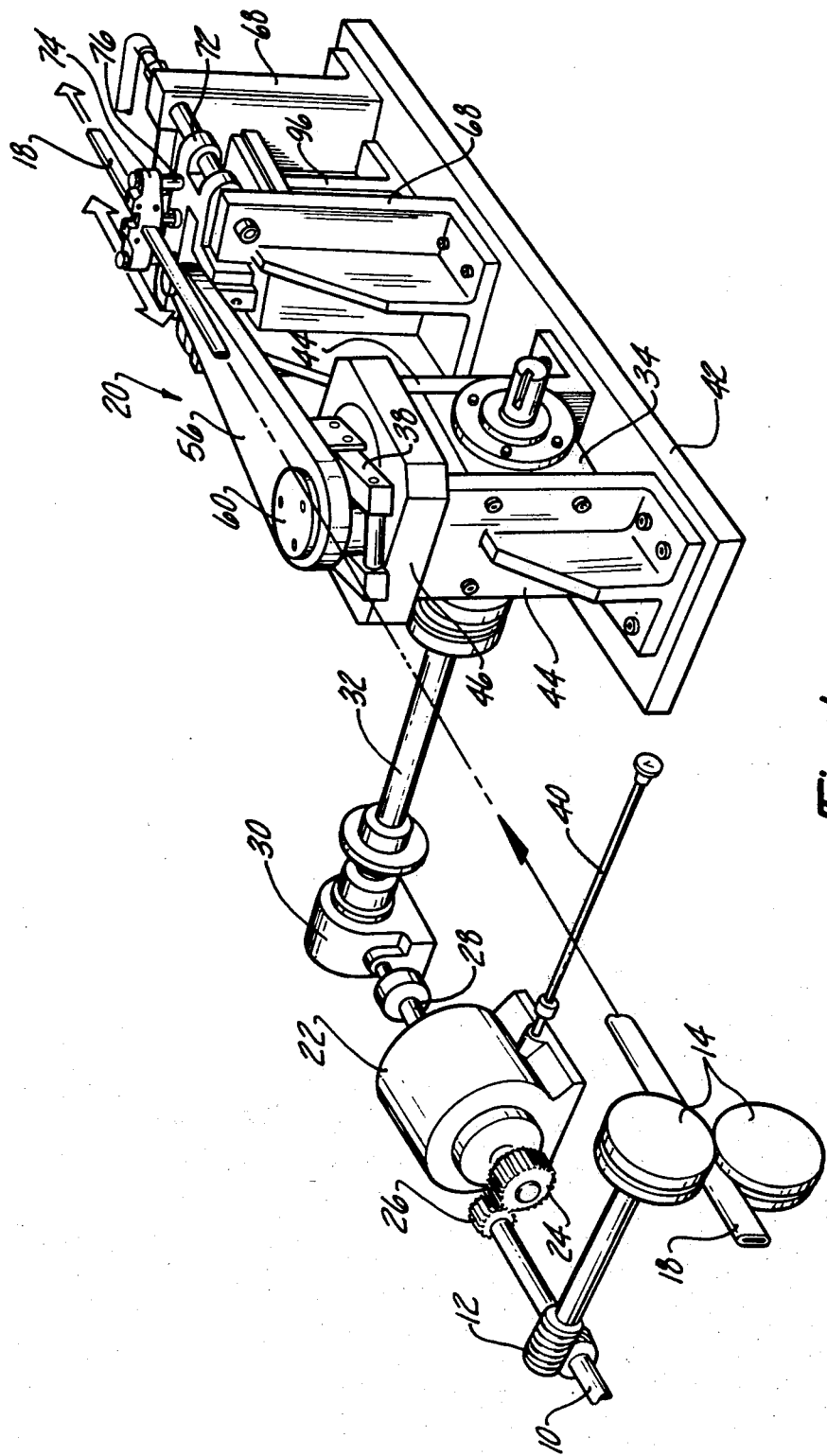

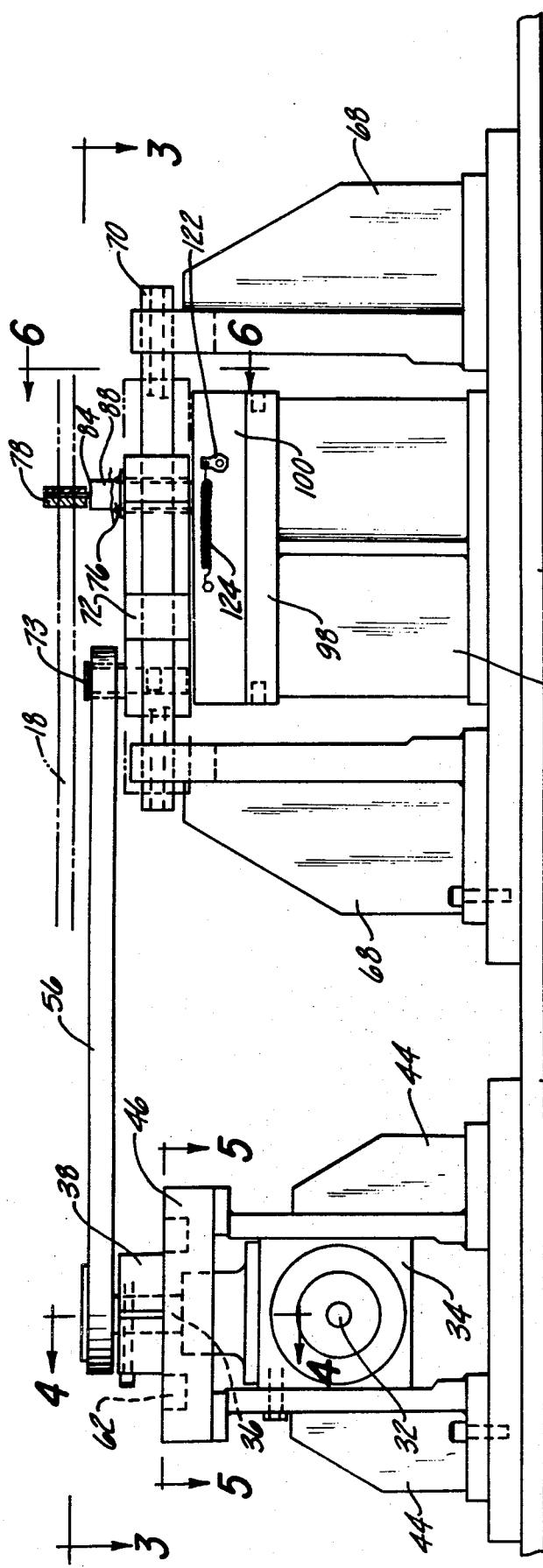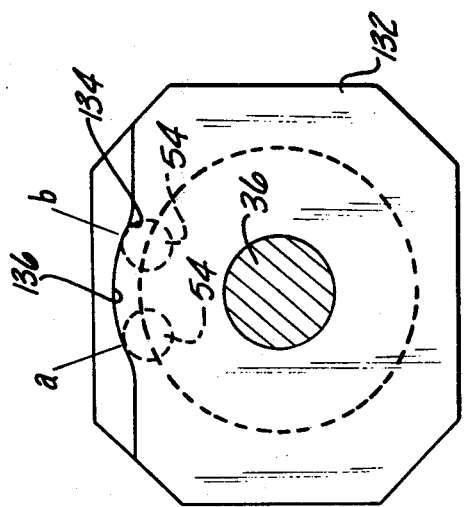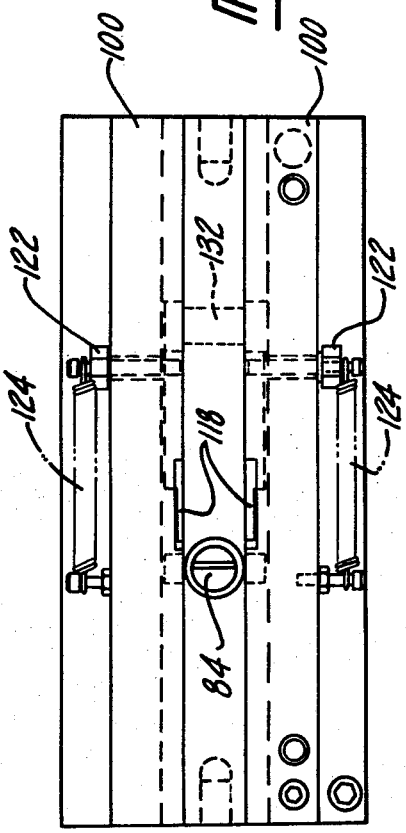

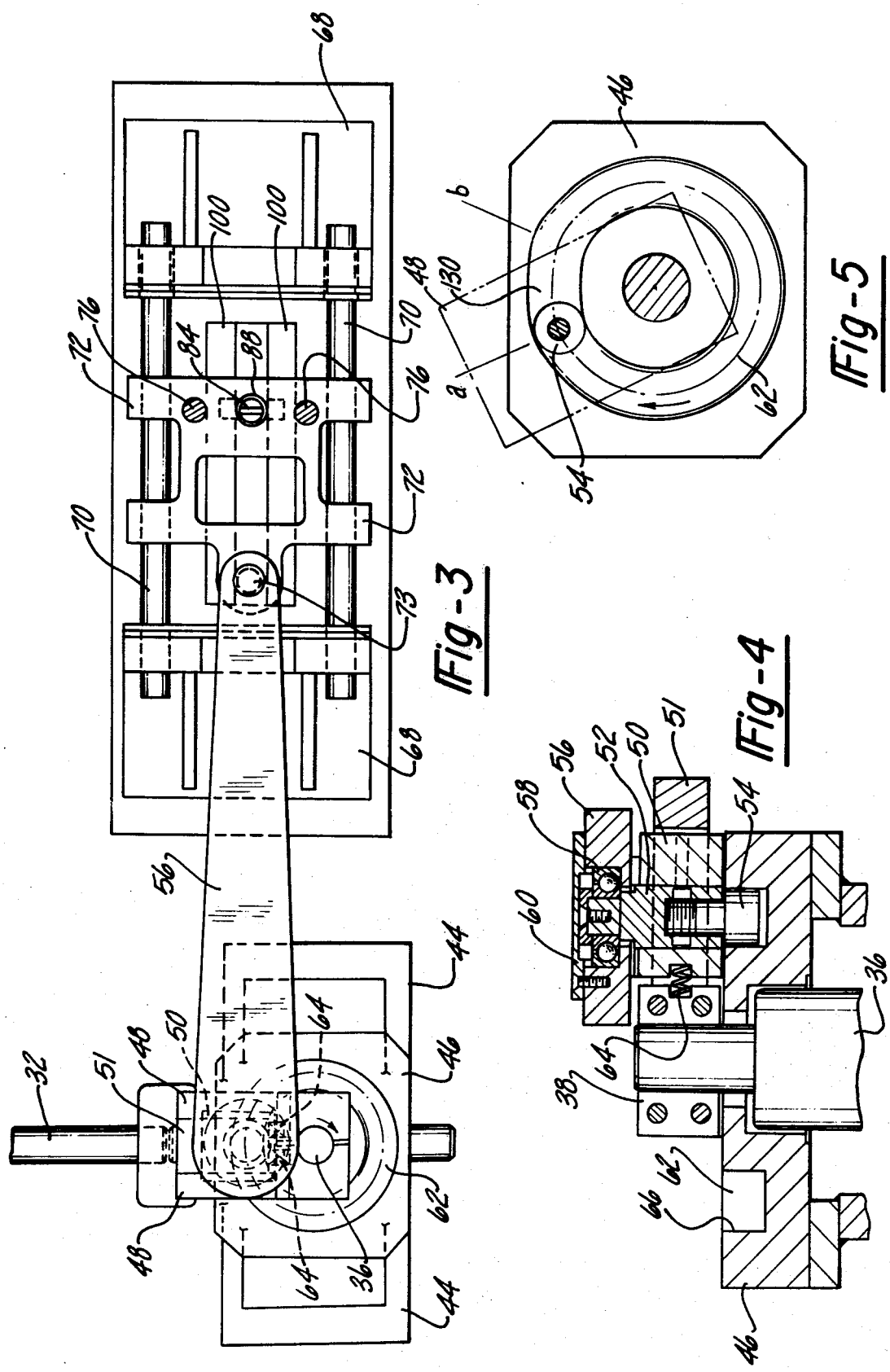

TUBE CUT-OFF MACHINE

This invention relates to a tube cut-off machine and, more particularly, to a machine of this type wherein the cut-off operation is performed while the tube is moving in a rectilinear path at a high rate of speed.

In the manufacture of many products, heat exchangers for example, there is a need for large quantities of tubes cut to a very precise length with their ends accurately perpendicular to the axis of the tube. Machines for cutting such tubes to length have been provided heretofore. From the standpoint of economy it is a practical necessity that such machines are capable of cutting tubes while the tubes are moving in a rectilinear path at a relatively high velocity, preferably as the tube is exiting from the last form roll of a tube mill. Thus, such machines invariably employ a slide of some type on which the cut-off device is mounted and a means for moving the slide at the same speed as the tube during the severing operation. Heretofore complicated and costly devices have been employed for synchronizing the speed of the tube drive means and the speed of the slide on which the cut-off device is mounted. These means have been primarily electrically or air operated. Such synchronizing devices have been not only expensive, but have been unreliable over a long period of time and also incapable of functioning accurately when the tube speed is in excess of about 175 feet per minute.

The present invention has for its primary object to provide a machine of the type described which is of economical construction and capable of operating at substantially higher speed than the prior art machines with an extremely high degree of accuracy.

A further object of the invention is to provide a machine of the type described wherein the tube drive means and the tube cut-off device are mechanically interconnected and their speeds are synchronized exclusively by mechanical means so that any slight variation in the speed of the tube drive means results in a corresponding variation in the speed of the cut-off device.

Other objects, features and advantages of the present invention will become apparent from the following description and accompanying drawings, in which:

FIG. 1 is a perspective view of the downstream end portion of a tube mill having associated therewith a tube cut-off mechanism according to the present invention;

FIG. 2 is a side elevational view of the tube cut-off mechanism;

FIG. 3 is a sectional view taken along the line 3—3 in FIG. 2;

FIG. 4 is a sectional view taken along the line 4—4 in FIG. 2;

FIG. 5 is a sectional view taken along the line 5—5 in FIG. 2;

FIG. 8 is a plan view of the blade actuating mechanism;

FIG. 10 is a plan view of a modified form of cam track.

Figure 6:
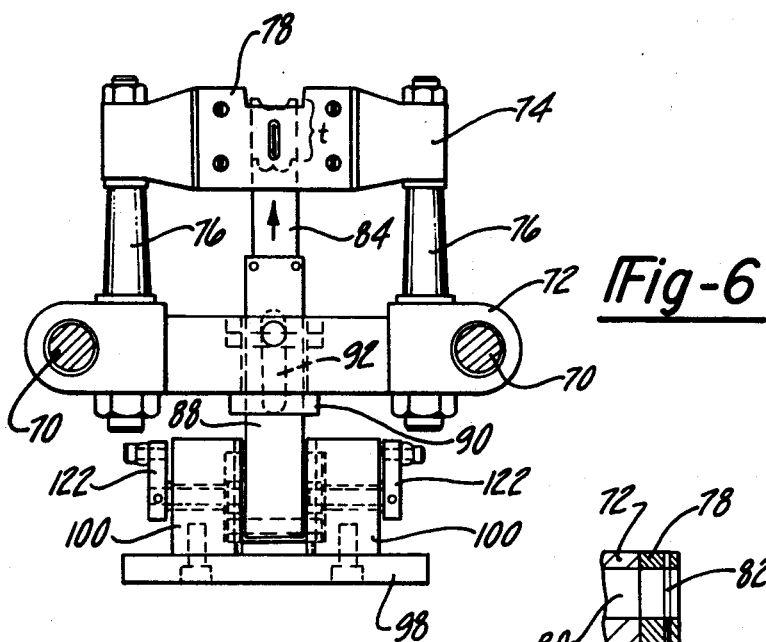
FIG. 6 is a sectional view taken along the line 6—6 in FIG. 2.

Referring to FIG. 1, there is illustrated the downstream end of a tube mill having a main drive shaft 10 which drives, as by gears 12, a plurality of successive tube forming rolls, the downstream endmost rolls being designated 14. The exit velocity of the tube 18 being formed by the mill is determined by the rotary speed of the rolls 14 which drive the tube. The tube cut-off device, which is generally designated 20, is driven from main shaft 10. The drive mechanism includes an infinitely adjustable drive unit 22 having a gear 24 on its input shaft engaged with a gear 26 on drive shaft 10 and an output shaft 28 coupled to a right angle gear drive 30 which is coupled, as by shaft 32, to gears within a gear box 34. The output shaft 36 (FIG. 4) of gear box 34 extends vertically upwardly and has a crank 38 fixedly connected thereto. The rotary speed of output shaft 36 can be varied to a high degree of accuracy relative to the rotary speed of shaft 10 by a rotatable adjusting rod 40 on the infinitely variable drive unit 22.

The tube cut-off unit 20 is mounted on a base plate 42 and the gear box 34 is mounted on base plate 42 by means of brackets 44. A cam plate 46 is fixedly mounted on the upper end of brackets 44. The upper end of output shaft 36 extends through cam plate 46.

Referring to FIGS. 3 and 4, crank 38 has a pair of laterally spaced arm extensions 48 between which a slide block 50 is guided for movement radially relative to the axis of output shaft 36. The outer ends of arm extensions 48 are interconnected by a cross piece 51. A stud 52 extends vertically in block 50 and is fixed therein in any suitable manner. A cam follower 54 is threaded upwardly into the lower end of stud 52 and a link 56 is rotatably supported on the upper end of stud 52 by a bearing 58. A cap 60 secured to the upper face of link 56 overlies bearing 58 and secures link 56 on stud 52. Cam follower 54 engages a generally circular cam track 62 in cam plate 46. Cam track 62 is generated around the axis of shaft 36 as its center. A pair of compression springs 64 arranged radially between slide block 50 and the inner end of crank 38 urges block 50 radially outwardly so that cam follower 54 is normally urged against the outer side wall 66 of cam track 62.

A second set of upright brackets 68 are mounted in longitudinally spaced relation on base plate 42 downstream from gear box 34. A pair of parallel spaced guide bars 70 are mounted on and extend between brackets 68. Guide bars 70 are parallel to and spaced equally on opposite sides of the rectilinear path of travel of tube 18 as it exits from between form rolls 14. These guide bars support a slide 72 to which the other end of link 56 is connected as at 73. It therefore follows that, in response to the rotation of shaft 36, slide 72 is reciprocated on guide bars 70.

An elevated cross head 74 (FIG. 6) is mounted on slide 72 by a pair of upright rods 76. Cross head 74 extends transversely of the path of travel of slide 72 and supports a tube guide in the form of a die 78. A horizontally extending passageway 80 in cross head 74 and die 78 is sized to accommodate the tube 18 traveling downstream therethrough. The die is also provided with a vertical slot 82 to accommodate a cut-off blade 84. Blade 84 is connected, as by cotter pins 86 or the like, to the upper end of a hollow plunger 88 which is supported in slide 72 for vertical reciprocation as by a bushing 90. Plunger 88 is formed with a vertical slot 92 which accommodates a pin 94. Pin 94 is fixedly mounted in slide 72 and projects into the hollow plunger 88. Pin 94 prevents rotation of plunger 88.

Figure 7:
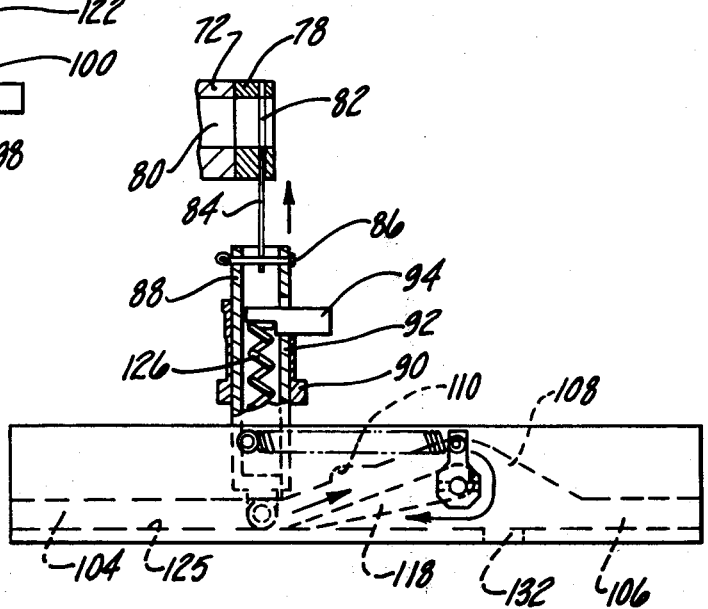
FIG. 7 is an elevational view partly in section showing the blade actuating mechanism.
Figure 9:
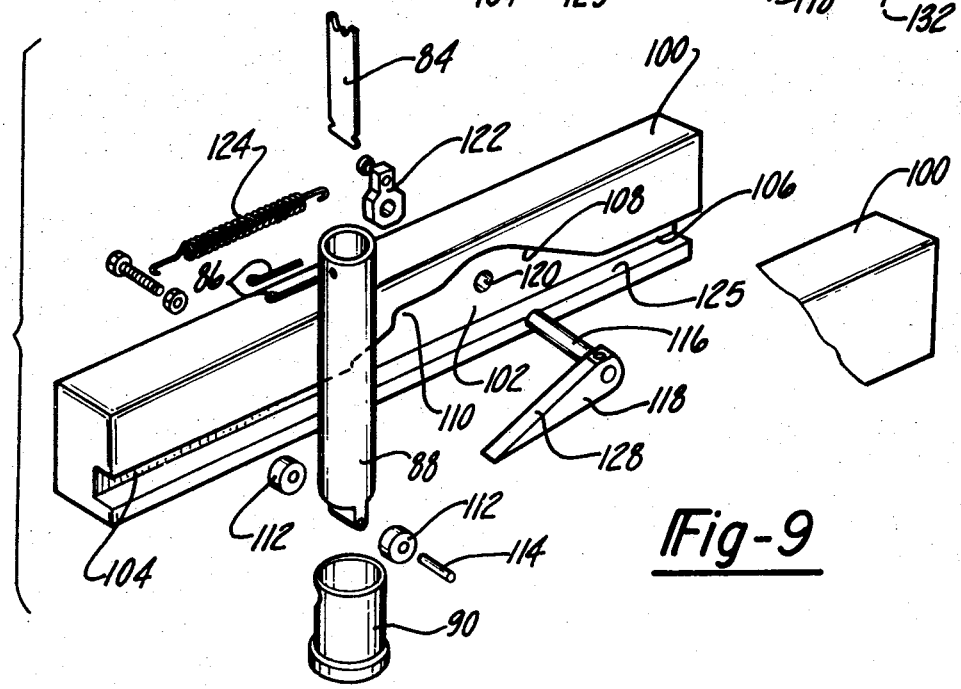
FIG. 9 is an exploded perspective view of the blade actuating mechanism.

Between brackets 68 there is mounted on bottom plate 42 an upright support 96 having a top support plate 98. A pair of spaced cam blocks 100 are mounted on top plate 98 in parallel spaced relation. Blocks 100 extend lengthwise between brackets 68 and are spaced laterally apart sufficiently so that the lower end of plunger 88 can extend downwardly therebetween as shown in FIG. 6. Each block 100 is formed with a cam track 102 having a horizontal rear portion 104 and a horizontal forward portion 106 connected by an upwardly extending portion 108 provided with a recess 110. Cam tracks 102 are designed to accommodate a pair of cam follower rollers 112 journalled on the lower end of plunger 88 by a pin 114. On each of the cam blocks 100 there is pivotally supported, as by a pin 116, a wedge-shaped lever 118. Each pin 116 extends transversely through its respective block 100 through an opening 120. A short crank 122 is fixedly connected to the outer end of each pin 118. A tension spring 124 is connected to each crank 122 and normally biases levers 118 downwardly in a counterclockwise direction as viewed in FIGS. 7 and 9 so that the distal ends of levers 118 engage the bottom horizontal face 125 of track 102. Recesses 110 are formed in cam track 102 to accommodate the distal ends of levers 118 when they pivot upwardly in a clockwise direction. Plunger 88 is biased downwardly by a compression spring 126, the upper end of which bears against pin 94 and the lower end of which bears against the bottom wall of the hollow plunger. When the cam follower rollers 112 are engaged within the horizontal portions 104,106 of cam track 102 blade 84 is in the retracted position wherein its lower edge is spaced at least slightly below the passageway 80 in die 78.

In operation it will be appreciated that, as crank 38 rotates, link 56 is oscillated and reciprocates slide 72 on guide bars 70. In the fully retracted position of slide 72 plunger 88 is located adjacent the rear portion of cam blocks 100 and cam followers 112 are engaged in the rear horizontal portion 104 of cam track 102. After slide 72 has moved forwardly a predetermined extent, cam followers 112 engage the top faces 128 of wedge levers 118 and start to shift plunger 88 and blade 84 upwardly. Prior to engagement of blade 84 with tube 18 in passageway 80, it is essential that the slide 72 is moving at exactly the same lineal speed as the rectilinear speed of the tube. Consequently, it is apparent that if cam track 62 is a perfect circle, slide 72 will not be moving at a uniform speed. Consequently, the portion 130 of cam track 62, that portion wherein the cam follower 54 is travelling at its maximum velocity, is altered so that slide 72 moves at a uniform speed during that portion of the stroke of blade 84 where it is severing the tube. The modification required of the cam track portion 130 to effect a constant velocity of slide 72 during this portion of its stroke can be determined graphically or mathematically, taking into account the throw of crank 38 and the length of link 56. In the arrangement illustrated the portion 130 is slightly flattened relative to the curvature of the circular portion of cam track 62 and extends circumferentially through an angle of about 27° between points a and b on the periphery of the cam track. It will be appreciated that between points a and b the slide is moving at its maximum speed in the forward direction.

In view of the above, when cam follower 54 engages the modified cam track portion 130, knife blade 84 is moving upwardly in groove 82 through the tube and is moving forwardly with the slide at the same speed as the tube. Thus, while the tube is being severed, it is stationary relative to slide 72. However, even though slide 72 moves at a uniform speed while the tube is being cut, it is also essential that the slide is moving at exactly the same speed as the tube. This adjustment can be visually determined by examining the severed edge of the tube. If the tube is moving faster than the slide, there will be evidence of buckling of the tube lengthwise. If the slide is moving faster than the tube, then the severed edge of the tube will be angled upward and forwardly rather than perpendicular to the axis of the tube. When there is no evidence of buckling and the severed end of the tube is exactly perpendicular to the longitudinal axis of the tube, the operator is assured that the tube and slide are moving at exactly the same speeds.

When the cam followers 112 ride off the upper ends of levers 118, plunger 88 shifts abruptly downwardly under the bias of spring 126 and engages a shock absorbing pad 132 to prevent bouncing of the plunger and blade. After the tube is severed slide 72 moves forwardly a short distance in cam track portion 106, but shortly thereafter the slide begins to retract so that the cam followers 112 ride along the horizontal bottom face 125 of the cam track. When the cam followers 112 engage the underside of levers 118, they pivot the levers upwardly to an out-of-the-way position wherein the distal ends of the levers swing into recesses 110. This enables plunger 88 and the cam followers 112 to retract to the starting position of slide 72.

FIG. 10 illustrates a modified form of cam plate and cam track. On the cam plate 132 shown in FIG. 10 the cam track 134 engaged by cam follower 54 has only a limited arcuate extent. The cam track portion 136 of cam track 134 which extends between the points a and b is shaped such as to cause slide 72 to move at a uniform speed during that portion of its stroke in which the tube is being severed. Cam track portion 136 corresponds to the cam track portion 130 of cam track 62 shown in FIG. 5. The opposite ends of cam track 134 are relatively short and merge smoothly into cam track portion 136. The cross piece 51 which interconnects the outer ends of arm extensions 148 on crank 38 (FIG. 4) is spaced radially from the axis of rotation of the crank a distance slightly greater than cam track portion 136. Thus, when the cam follower rolls out of engagement with cam track 134, slide block 50 abuts radially against cross piece 51. The cam follower is guided smoothly into and out of engagement with cam track portion 134 by the arcuate end portions of track 134. The cam follower is subjected to less wear with the arrangement shown in FIG. 10.

Thus it will be seen that the tube cut-off unit of the present invention is controlled in all respects mechanically. It is driven through gears or equivalent mechanical means from the main drive shaft 10 of the tube mill. As a result, the output shaft of gear box 34 always rotates at a speed which varies directly with the speed of the form rolls 14. The adjustment obtained by means of the drive unit 22 in combination with cam track segment 130 assures movement of slide 72 at exactly the same speed as the lineal speed of tube 18 during the severing operation. In addition, the blade itself is mechanically controlled by means of plunger 88 and cam track 102 so that severing of the tube occurs only during that short interval of time when slide 72 is moving at exactly the same speed as the tube. The completely mechanical drive and synchronization enables the unit to be operated at a relatively high speed. For example, 18 inch length tubular segments may be cut at the rate of 5 pieces per second when the tube is moving at a speed of about 400 feet per minute.

It will be appreciated that, although the cut-off mechanism has been described in connection with a tube mill, it can be utilized in any roll forming operation where a generally flat continuous strip stock is rolled into a desired cross sectional shape, such as a channel, U, T, Z, etc.

I claim:

1. In a strip forming mill of the type including a shaft for rotating rolls which form and/or drive the formed strip axially, a mechanism for cutting the formed strip into successive segments of predetermined length while it is being so driven comprising a drive unit having mechanically connected input and output shafts so that the output shaft rotates at all times at a speed proportional to a high degree of accuracy to the speed of the input shaft, means mechanically interconnecting said input shaft with said roll driving shaft for rotation in unison, a base, a slide mounted for reciprocation on said base in the path of travel of the formed strip, means mechanically interconnecting the output shaft of the drive unit with said slide for reciprocating the slide through a predetermined stroke, said last-mentioned means including a mechanical device for causing the slide to move at a uniform speed through at least one portion of its stroke, means for adjusting the speed of the output shaft of the drive unit relative to its input shaft such that the slide moves at exactly the same speed as the formed strip during said portion of its stroke, guide means on said slide through which the tube is adapted to move, a cut-off blade mounted for reciprocation on said slide across said guide for severing a segment off the end of the formed strip and mechanical means operated in response to reciprocation of the slide for causing the blade to move through said guide in one direction to sever the formed strip during said one portion of the stroke of the slide, said mechanical means comprising a cam track on said base extending in a direction aligned with the path of travel of the slide, a cam follower on said blade engaged with said cam track, said cam track including one portion inclined toward the slide which is engaged by the cam follower when the slide is moving in one direction and a second portion extending parallel to the stroke of the slide when the slide is moving in the opposite direction, said inclined portion of the track being defined in part by a lever supported for pivotal movement about an axis perpendicular to the path of travel of the slide, said lever having its free end normally engaging said second portion of the cam track to pivot to an out-of-the-way position when the slide is moving in said opposite direction.

2. In a strip forming mill of the type including a shaft for rotating rolls which form and/or drive the formed strip axially, a mechanism for cutting the formed strip into successive segments of predetermined length while it is being so driven comprising a drive unit having mechanically connected input and output shafts so that the output shaft rotates at all times at a speed proportional to a high degree of accuracy to the speed of the input shaft, means mechanically interconnecting said input shaft with said roll driving shaft for rotation in unison, a base, a slide mounted for reciprocation on said base in the path of travel of the formed strip, means mechanically interconnecting the output shaft of the drive unit with said slide for reciprocating the slide through a predetermined stroke, said last-mentioned means including a mechanical device for causing the slide to move at a uniform speed through at least one portion of its stroke, means for adjusting the speed of the output shaft of the drive unit relative to its input shaft such that the slide moves at exactly the same speed as the formed strip during said portion of its stroke, guide means on said slide through which the tube is adapted to move, a cut-off blade mounted for reciprocation on said slide across said guide for severing a segment off the end of the formed strip and mechanical means operated in response to reciprocation of the slide for causing the blade to move through said guide in one direction to sever the formed strip during said one portion of the stroke of the slide, said means for reciprocating said blade comprising a plunger mounted for axial reciprocation on said slide in a direction transversely of the path of travel of the slide, said blade being connected to one end of said plunger, said plunger having cam follower means at its opposite end and a cam track on said base engaged by said last-mentioned cam follower means, said cam track extending in a direction parallel to the path of reciprocation of the slide and having a configuration for causing the blade to pass through said guide to sever the tube during said one portion of the stroke of the slide, said cam track being defined in part by a lever supported on said base for pivotal movement about an axis extending transversely of the path of travel of the slide, said lever having a pair of faces which converge in a direction away from its pivot axis, said cam follower means engaging one of said faces to cause the blade to sever the tube when the slide is moving forwardly and engaging the other cam face to pivot the lever out of the path of travel of the cam follower means when the slide is retracted, whereby to minimize the reciprocating stroke of the blade.

3. In a device for severing a strip of material moving in a linear path the combination comprising a base, a slide mounted for reciprocation on said base in the path of travel of said strip, means for reciprocating the slide through a predetermined stroke for causing the slide to move at a uniform speed during at least one portion of its stroke so as to correspond with the lineal speed of the strip, a cut-off blade mounted for reciprocation on said slide across the path of travel of the strip for severing a segment off the end of the strip and mechanical means operated in response to reciprocation of the slide for causing the blade to move across said path in one direction to sever the formed strip during said one portion of the stroke of the slide, said means for reciprocating the blade on the slide comprising a cam track on said base extending in a direction aligned with the path of travel of the slide, a cam follower on said blade engaged with said cam track, said cam track including one portion inclined toward the slide which is engaged by the cam follower when the slide is moving in one direction and a second portion extending parallel to the stroke of the slide when the slide is moving in the opposite direction, said inclined portion of the track being defined in part by a lever supported for pivotal movement about an axis perpendicular to the path of travel of the slide, said lever having its free end normally engaging said second portion of the cam track to pivot to an out-of-the-way position when the slide is moving in said opposite direction.

* * * * *